(No Model.) 4 Sheets—Sheet 1.
L. GUTMANN.
METHOD OF OPERATING ALTERNATING ELECTRIC MOTORS.
No. 458,164. Patented Aug. 25, 1891.
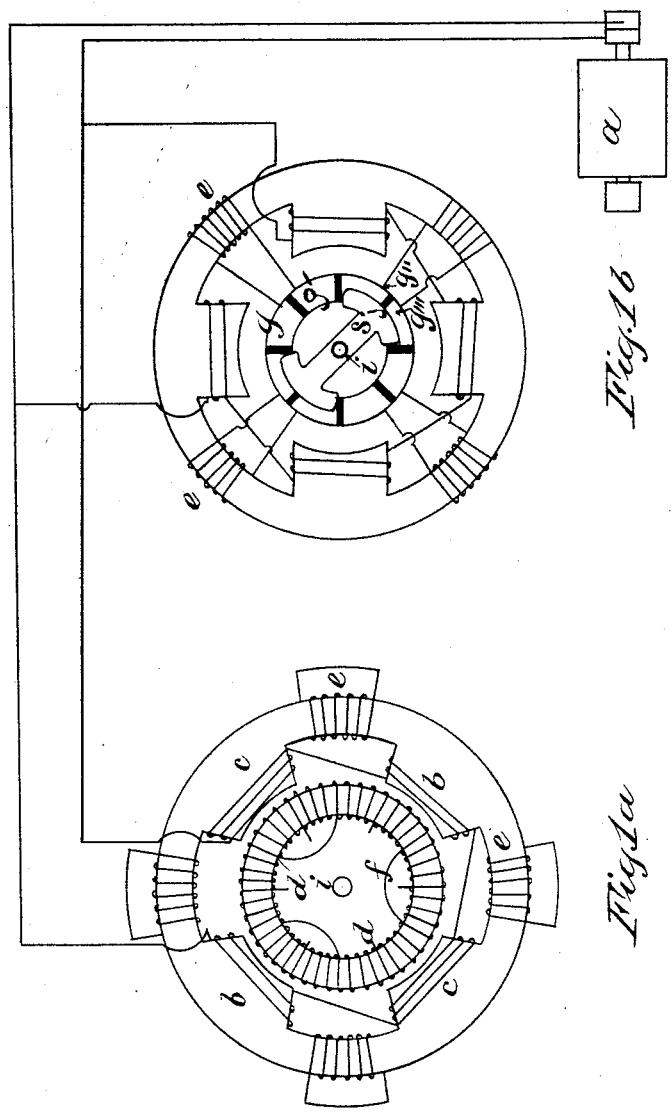
Witnesses:
D. W. Gardner
Nellie L. Pope
Inventor:
Ludwig Gutmann
By his Attorney,
Edward P. Thompson (No Model.) 4 Sheets—Sheet 2.
L. GUTMANN.
METHOD OF OPERATING ALTERNATING ELECTRIC MOTORS.
No. 458,164. Patented Aug. 25, 1891.
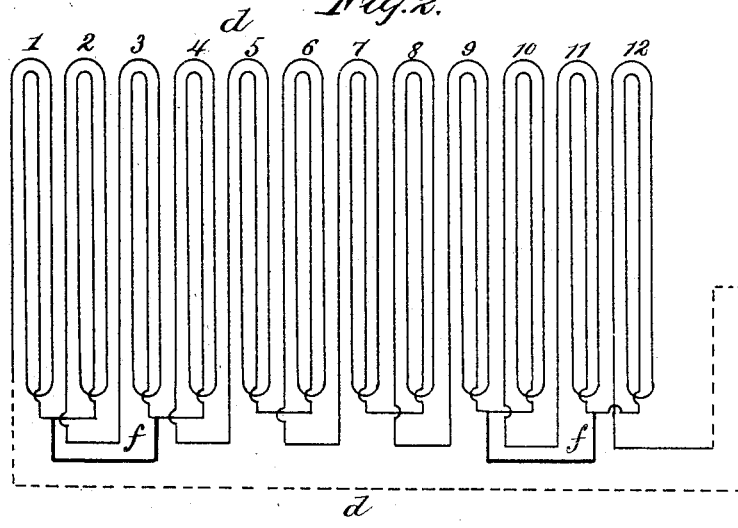
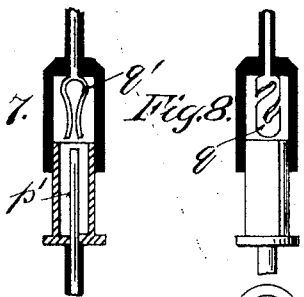
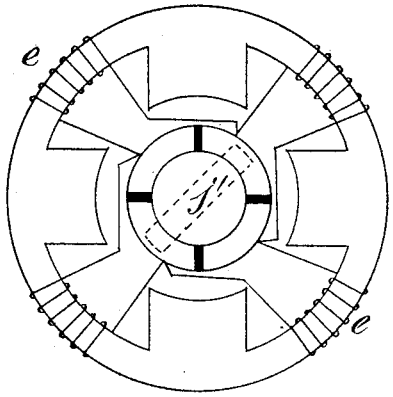
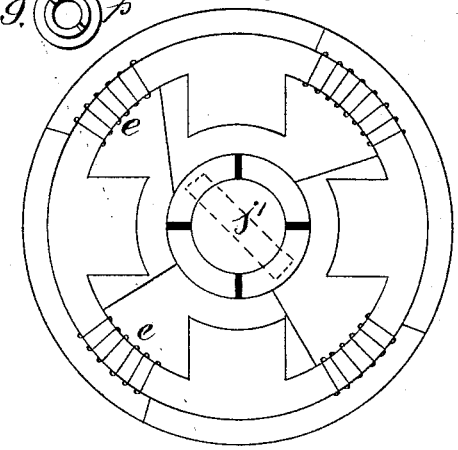
Witnesses:
D. W. Gardner
Nellie L. Pope
Inventor:
Ludwig Gutmann
By his Attorney,
Edward P. Thompson (No Model.) 4 Sheets—Sheet 3.
L. GUTMANN.
METHOD OF OPERATING ALTERNATING ELECTRIC MOTORS.
No. 458,164. Patented Aug. 25, 1891.
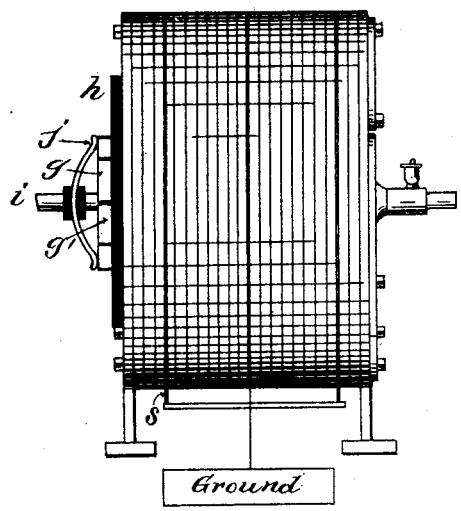
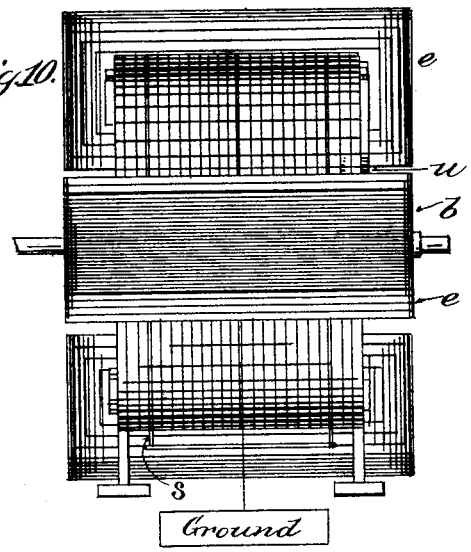
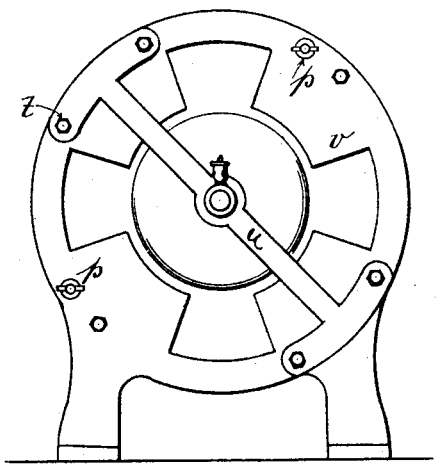
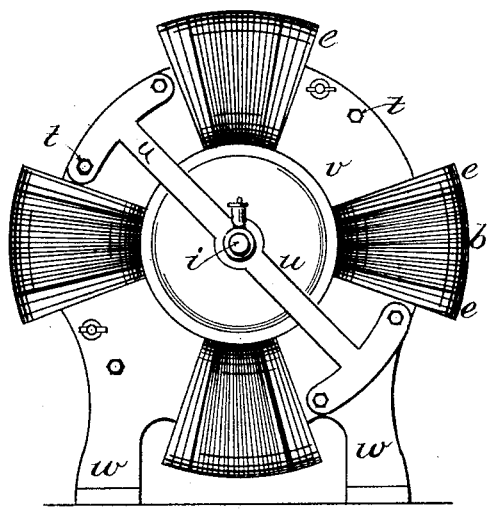
Witnesses:
D. W. Gardner
Nellie L. Pope
Inventor:
Ludwig Gutmann
By his Attorney
Edward P. Thompson (No Model.) 4 Sheets—Sheet 4.

L. GUTMANN.
METHOD OF OPERATING ALTERNATING ELECTRIC MOTORS.

No. 458,164. Patented Aug. 25, 1891.

UNITED STATES PATENT OFFICE.

LUDWIG GUTMANN, OF PITTSBURG, PENNSYLVANIA.

METHOD OF OPERATING ALTERNATING ELECTRIC MOTORS.

SPECIFICATION forming part of Letters Patent No. 458,164, dated August 25, 1891.

Application filed February 4, 1890. Serial No. 339,176. (No model.)

*To all whom it may concern:*

Be it known that I, LUDWIG GUTMANN, a subject of the German Emperor, and a resident of Pittsburg, county of Allegheny, and State of Pennsylvania, have invented certain new and useful Improvements in Methods of Operating Alternating Electric Motors, (Case 41,) of which the following is a specification.

My invention relates to an apparatus for and a method of producing relative motion of the two elements of an electric motor by means of an alternating, pulsating, or intermittent electric current.

The object of the invention is to provide an alternating-current motor which possesses the property of being self-starting, self-regulating within certain limits of load, and of such high efficiency as to be applicable for practical use.

The invention consists, generically and specifically, as set forth hereinafter.

A motor in all its details and modifications for carrying out my invention is described by reference to the accompanying drawings, in which—

Figure 12:
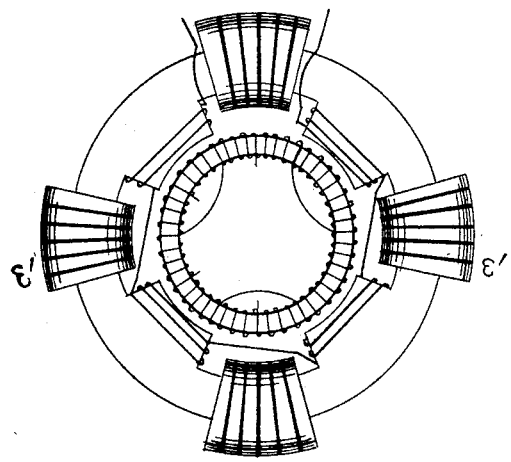
Figure 13:
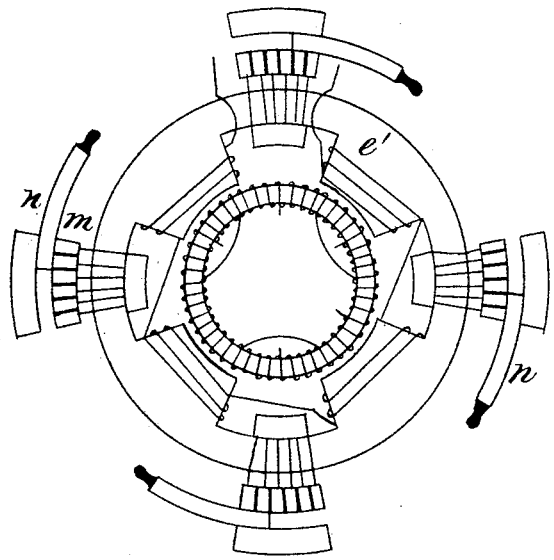

Figure 1 represents two forms of motor embodying my invention, the circuits and electrical connections being represented in diagram. Fig. 1$^a$, which is a part of Fig. 1, is a view of that form which does not need a commutator, or "rotary circuit closer and opener," more properly called, while Fig. 1$^b$ is a motor provided with a commutator or circuit-changer. Fig. 2 is a view of the armature-coils evolved upon a plane, the said coils belonging to the motor shown in Fig. 1$^a$. The manner of short-circuiting the coils is shown also. Figs. 3 and 4 are modifications in diagram relating to the electrical windings and connections of those field-magnet coils which may conveniently and properly be termed the "secondary exciting" or "field-magnet" coils, for reacting upon the poles produced in the armature by the primary exciting-coils. Figs. 5 and 6 are respectively end and side elevations of a complete motor, except that the field-magnet coils, both primary and secondary, are omitted. Figs. 7, 8, and 9 are different views of a safety binding-post. Figs. 10 and 11 are similar views to Figs. 5 and 6, respectively, with the primary and secondary exciting-coils applied, each primary being between two secondaries. Fig. 12 is a modification of the field-magnets. Fig. 13 represents, in combination with the motor, a system of electric regulation.

The principle of the invention may be described as follows: Experiment shows that if I take a ring or drum armature from which the commutator is removed, but the wires otherwise closed, as usual, and, in addition, if I connect here and there electrically some of the coils in groups of twos, threes, or more, then on exciting the field-magnet in any convenient manner a very powerful and efficient torque is produced between the field-magnet and the closed groups of coils on the armature. If the field-magnet is provided with only the ordinary windings there would be a torque between the field-magnet poles and those poles developed by the action of the groups of armature-coils above alluded to; but when these poles have finally approached, rotation and all motion ceases. To obtain rotation, I provide the field-magnets with additional but independent coils closed upon themselves, or, as a substitute, separated rings; or, further, the ends of the extra and independent coils upon the field-magnet core may be connected to plates of a suitable commutator.

In Figs. 1$^a$ and 1$^b$ may be seen the two motors connected up in circuit with the alternating-current generator $a$. The first motor consists of the combination of field-magnet coils $b$, wound upon the field-magnet core $c$, additional and independent coils $e$, wound upon the core $c$, the said coils last mentioned being closed coils, and therefore conveniently called "closed secondary coils" or "secondary field-magnet coils," and an armature having a closed coil $d$. (Seen in end view and evolved in Fig. 2.) $f$ represent conductors, connecting different parts of the coils $d$, thereby serving to form groups of coils. The windings $d$ are formed of multiple coils and the conductors $f$ connect the multiple coils into groups. In Fig. 1$^b$ the armature-coils are the same, although not visible, while the ends of the coils $e$, instead of being closed, as in Fig. 1$^a$, are connected to the successive plates $g\ g'\ g''\ g'''$, &c. These commutator-plates are insulated from one another and the body of the machine, as shown by observing the insulation

*h* in Fig. 5. Mechanically connected to but electrically insulated from the shaft *i* is a contact-strip *j*, resting on the plates *g g' g'' g'''* in such a manner that at any position it connects two contiguous plates with two opposite plates. When the shaft rotates, the strip *j* passes over and in contact with the plates of the commutator. In this same figure it will be noticed, also, that there are twice as many commutator-plates as there are coils *e*. In Figs. 3 and 4 there is the same number of each and they are connected in a different manner together. In Fig. 3 the ends of the coils *e* are connected to the commutator-plates in such a manner that the first end of the first coil is connected to the first plate, the second end of the same coils is connected to the second plate and to the first end of the second coil, while the second end of the second coil is connected to the third plate, and so on for any number of coils like a closed-coil armature. In Fig. 4 the first ends in order of the coils are connected in order to the commutator-plates, while the second ends of the same coils in the same order are connected to a common conductor *l*. The contact for the plates is lettered *j'* in both figures, and in its normal position connects any two opposite commutator-plates. It is shown in dotted lines. The connections are like those of an open-coil armature.

In Fig. 12 the coils *e* are replaced by rings *e'*, insulated from each other. They perform the same function as the coils *e*.

In Fig. 13 the coils *e* are provided with terminals *m*, arranged like the terminals of a resistance-box, so that a contact-slide *n* can be moved over the same in such a manner as to cut out more or less of the windings. As soon as a pulsating, alternating, or intermittent current is circulated around the field-winding the commutatorless armature is set in rotation, carrying with it the brush J, which is successively brought in contact with all commutator-plates *g g' g''*, &c. The contact-strips *j* and *j'* in their normal position are preferably placed at an angle to the closed sets of armature-coils, as may be seen in the figures. As the armature rotates and carries along with it the brush J, the latter closes successive field-coils upon themselves, or else joins in succession groups of field-coils connected to the commutator with others into two or more closed circuits, thereby creating secondary poles controlled by the position of the brush J, which poles react on the alternating or intermittent field generated by the energizing field-magnet coils. It is evident that if the armature has six or eight or more short-circuited coils which have to rotate in front of twice the number of poles or more the strongest effect would be if they were all acted upon simultaneously. In this case it would be necessary to have multiple contact-strips *j* and multiple commutator-plates or multiple contact-strips in contact with one commutator.

In Fig. 2 the individual coils of the armature are numbered 1 2 3 4 5 6 7 8 9 10 11 12, and it will be noticed that the coils 1 and 4 are electrically connected by the conductor *f*, and that a similar conductor connects coils 9 and 12. As to the means of regulation, the greater the number of convolutions of coils *e*, closed by the metallic rod *n*, the larger will be the current exciting the field-magnet poles.

The explanation of the connections in Figs. 3 and 4 is similar to that given in regard to Figs. 1$^a$ and 1$^b$. The binding-posts of this motor are shown in Figs. 7, 8, and 9. *p* shows an end view of the two semicircular contact-pieces mounted upon the side of the machine. A yielding contact *q* is mounted upon the wire *r*, which is surrounded with insulation, as is also the yielding contact. The contact *q* may be placed between the contacts *p* without one's hands touching both terminals *r* and *p* at the same time, thereby providing safety to the manipulator of the motor.

In Fig. 7, a modification, *q'* is a double spring, which fits over the central contact *p'*.

In Fig. 1$^a$ the conductors *f* connect the terminals of every ninth coil alternately—*i. e.*, nine coils are short-circuited, the next nine are not short-circuited, the third nine are short-circuited, and so on around the circle.

To further provide against danger, I place conducting-plates, as of copper, (lettered *s*,) between any two of the iron plates of the core of the field-magnets and connect them electrically to the ground. This feature may be seen in Figs. 5 and 10. The iron plates of the said core are secured rigidly together by bolts *t*, which also serve to retain the bearings *u*, which uphold the shaft *i*. The outside plates *v* may be made thicker than the other iron plates as a means of stiffening the machine and making it stronger. This outside plate on each end of the machine is provided with legs *w*.

I claim as my invention—

1. In an electric motor, the combination of exciting-coils, field-magnets therefor, secondary exciting-coils in inductive distance from the first-named coils, armature-coils provided with conductors close-circuiting themselves in groups, and means for changing the circuit connections of said secondary exciting-coils.

2. In an electric motor, field-magnets, primary coils mounted upon the field-magnets, secondary coils also fixed thereon, a rotating armature whose coils are permanently connected in closed groups, and means for successively changing the circuit connections of the secondary field-magnet coils.

3. An alternating-current electric motor comprising an armature having two or more permanently-closed circuits, energizing field electro-magnets, secondary field-magnet coils, and means for continually shifting the neutral line of the secondary field.

4. In an electric motor, the combination of a field-magnet having two or more separate sets of exciting-coils, one set being in circuit with a suitable generator and the other or others being provided with terminal plates, a rotary armature, and a brush or brushes for said terminal plates mounted upon the armature-shaft.

5. An alternating-current electric motor comprising an armature having two or more permanently-closed circuits, field electro-magnets having two or more separate windings, one of which is in circuit with a suitable generator, and means for continually displacing the neutral line of the poles developed by the said second field-winding.

6. In an electric motor, the combination of an armature-core, a field-magnet, coils upon the armature connected into closed groups, exciting-coils upon the field-magnets, secondary field-coils in inductive distance to the exciting-coils, contact-terminals for said secondary field-coils, and a brush resting in turn on successive terminals of said secondary coils.

7. The herein-described method of operating an electric motor, consisting in producing in the armature-core a number of poles by one set of stationary field-magnet poles and acting on said armature-poles by a second set of field-magnet poles continually movable with respect to the first-named field-magnet poles.

8. In an alternating-current motor, the combination of an armature having two or more closed circuits, field electro-magnets having two or more separate windings, one of which is in circuit with a suitable generator, and a circuit-changing device connected to another winding for shifting the neutral line of the field caused by this second winding.

9. The combination, with a suitable generator, of an electric motor having an armature, field-magnet cores, exciting-coils mounted thereon and in circuit with said generator, mutiple secondary coils also mounted on said field-magnet core of said motor, and a contact slide or brush in contact with the terminals of said multiple secondary coils.

10. The hereinbefore-described method of operating an electric motor whose field-magnet consists of two separate alternating-current circuits and an armature provided with two or more closed-circuited windings, consisting in inducing a number of poles in the armature by the stationary poles of one magnet-circuit and reacting upon said armature by another field-magnet circuit whose pole positions are continually variable with respect to the first-named and fixed field-poles.

11. In an electric motor, the combination of exciting-coils in a single exciting-circuit, secondary stationary coils, a commutator having its plates connected with the ends in order of said secondary coils, a brush or brushes in contact with said commutator, and an armature relatively movable with respect to said field-coils.

12. An electric motor comprising an armature provided with circuits closed upon themselves, two sets of exciting-coils for said motor, one of which is closed through the generator, and a commutator and brushes in connection with terminals of the second set of exciting-coils for successively close-circuiting them upon themselves.

13. An electric motor comprising field-magnets, an armature movable relatively thereto, energizing field-magnet coils, secondary windings divided into sub-coils, a commutator whose plates are connected to the terminals of said sub-coils, and a brush adapted to rest in turn on successive commutator-plates.

14. An electric motor comprising one energizing-circuit, one reacting winding, and an armature having one or more separate closed windings, each subdivided into coils, and said coils closed into groups or circuits differing in number from the field-poles to produce armature-poles unequal therefrom in number.

In testimony that I claim the foregoing as my invention I have signed my name, in presence of two witnesses, this 20th day of January, 1890.

LUDWIG GUTMANN.

Witnesses:
E. W. KEALLY,
J. W. SMITH.